No. 844,904. PATENTED FEB. 19, 1907.
E. S. WILLIAMSON.
SPADE AND ANALOGOUS IMPLEMENT.
APPLICATION FILED MAY 10, 1906.
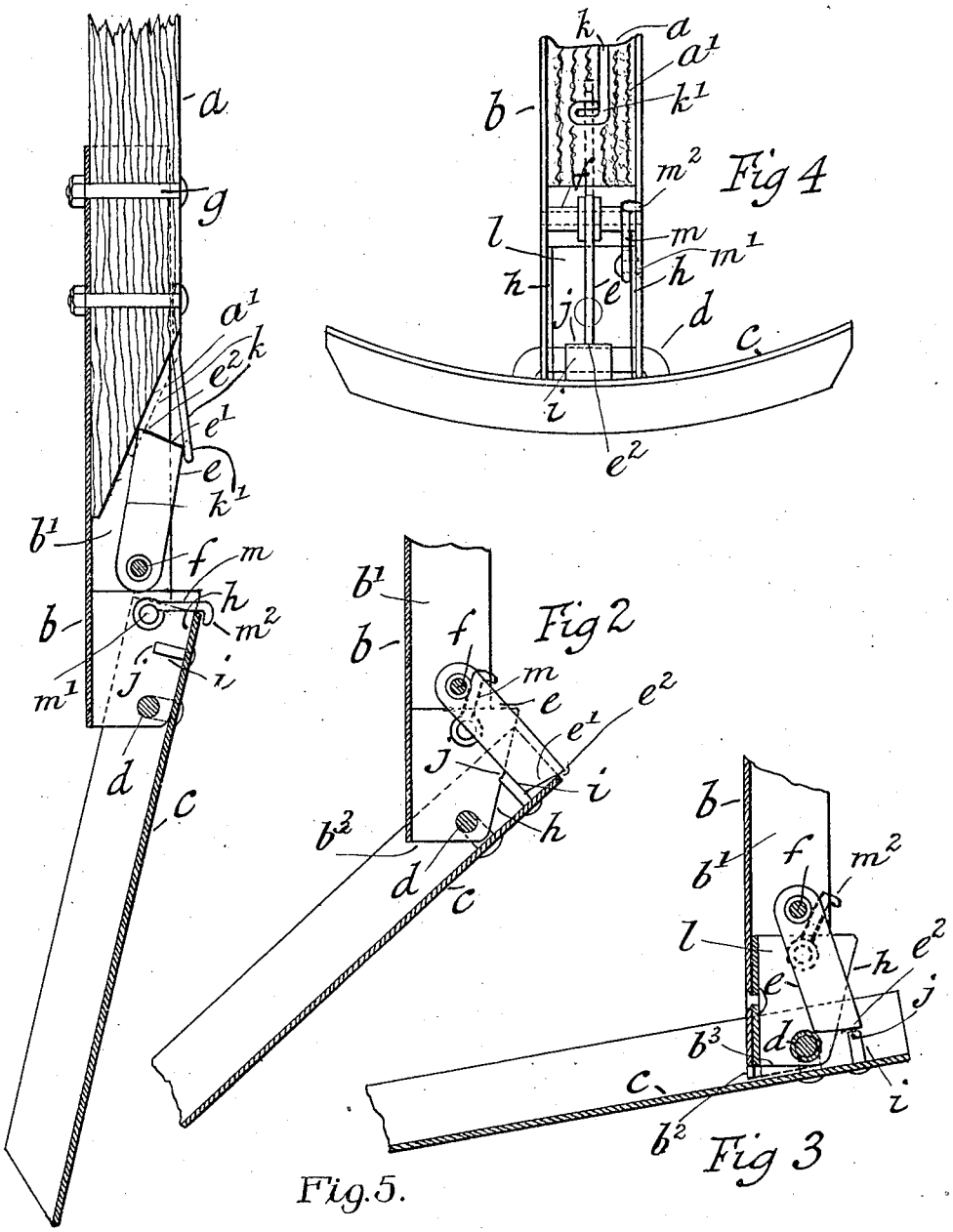
Witnesses.
Inventor:
E. S. Williamson.

UNITED STATES PATENT OFFICE.

ERNEST STANLEY WILLIAMSON, OF KERANG, VICTORIA, AUSTRALIA.

SPADE AND ANALOGOUS IMPLEMENT.

No. 844,904.     Specification of Letters Patent.     Patented Feb. 19, 1907.

Application filed May 10, 1906. Serial No. 316,164.

*To all whom it may concern:*

Be it known that I, ERNEST STANLEY WILLIAMSON, a subject of the King of Great Britain and Ireland, &c., residing at Kerang, in the State of Victoria, Commonwealth of Australia, have invented certain new and useful Improvements in Spades and Analogous Implements; and I do hereby declare the following to be a full, clear, and exact description of the invention, such as will enable others skilled in the art to which it appertains to make and use the same.

The object of this invention is to provide a spade, shovel, or implement for post-hole making and other work to enable earth and other material to be cut into, shifted, lifted vertically, and so on.

In its main essentials my invention comprises any suitable blade or material cutting or supporting member, as a shovel or spade, hoe, or analogous blade, any suitable handle, and an adjusting-dog or the like. The blade is adjustable and is pivoted or hinged to the handle near the lower end thereof, and (in suitable proximity to the blade) the dog is also hinged, pivoted, or movably connected to the handle or some suitable base.

The invention is illustrated in the accompanying drawings, which show the above features and also others which are referred to below.

Figure 1 shows (in sectional side elevation) part of an implement, the blade being shown at about the same set or angle to the handle as ordinary spades frequently have. Fig. 2 shows parts of Fig. 1 with the blade adjusted at a less obtuse angle to the handle. Fig. 3 shows parts of Fig. 1 with the blade adjusted to project at nearly right angles to the handle. Fig. 4 is a rear view of the parts in Fig. 3, with other parts of Fig. 1; and Fig. 5 is a perspective detail view of a catch for holding the blade locked in one position.

In these views, $a$ represents any suitable wooden or other handle, at its lower part usually being a metal socket $b$.

$c$ is a blade; $d$, any suitable pivot-pin riveted at each end or connected suitably to the blade; $e$, any suitable adjustable dog shown pivoted on a pin $f$. Pivot-pins $d\ f$ are conveniently located by passing them through the curved or other socket or lug $b$, to which the wood handle $a$ is attached in any suitable way, as by bolts and nuts $g$.

When the handle is held vertically with the dog hanging in its lowest position, the dog keeps the blade horizontal or as nearly so as may be predetermined, as seen in Fig. 3. With the parts in this position earth can be lifted from a narrow post-hole readily. When, however, the handle is held at a suitable inclination to the vertical or when in any way the dog is caused to move outward on its pivot from the said lowest previous position, so as to free the blade, the weight of the blade causes it to tilt or move toward a line which is longitudinal or nearly longitudinal with the handle of the device, as seen in Fig. 1. The dog may be or is loosely hung, so that by joggling the implement or tapping the blade change of position will occur. The blade contents can be readily discharged, and the implement, taking the position of Fig. 1, readily inserted into the hole or material. The swing of the blade toward the horizontal position (to dig up a load of earth) takes place easily when the handle is suitably actuated when the blade reaches the hole bottom or a suitable resistance. The blade is kept in some cases sufficiently rigid in longitudinal position to act as an earth (or material) cutting, collecting, or shifting instrument—that is, for example, like a common spade.

The socket or lug $b$ contains a recess $b'$, enabling the dog to lie therein free of the blade, thus, as in Fig. 1, when desired, avoiding projection. The dog end $e'$ is preferably beveled, so that the back part $e^2$ will act as the blade-stop, as seen in Figs. 2 and 3. Instead of the dog being hinged any mechanically equivalent arrangement may be used. I prefer to so arrange the pivot-pins $d\ f$ that they will stand long wear and avoid allowing the blade to become rickety. This is easily effected by mechanical skill.

When a semicircular curved or hollowed form is given to a socket $b$, of steel-plate, the back edges efford a wide bearing for the blade, enabling it to resist considerable strain, while at the same time the construction is simple, light, and economical. The handle-surface $a'$, Fig. 1, is beveled or located to act as a stop to prevent dog $e$ rising beyond a predetermined point. It would be usable if not so stopped; but it is an advantage to have a stop which will cause it to fall by gravity when in the position of Fig. 1, unless expressly held up. It will be understood that variations in form and minor detail may be adopted without departing from this invention.

When it is desired to use as a spade, for example, the implement in Fig. 1 position, any suitable means are employed to keep the blade and dog from swinging on their pivots. In the drawings, however, the means shown for locking the dog is a resilient arm or hook $k$, secured at one end to the handle $a$ and having the other end bent laterally, as at $k'$, and movable to the other side of the dog, as will be understood from Fig. 4, where the dog upper position is dotted. Normally the arm $k$ remains as shown in dotted lines in Fig. 1 when the dog is in use and as shown in full lines when the dog is locked in its uppermost or abnormal position. Then to hold the blade the means shown is an arm or hook $m$, pivoted, as at $m'$, to the socket or part $b$. Normally the position of this arm is out of the way of the blade and the dog, as seen in Figs. 2 to 4, where it presses the side of socket $b$; but it is movable to catch over part of the blade, as in Fig. 1. This catch is shown with a tooth or lug $m^2$, extending laterally, (see particularly Fig. 5,) whereby to spring behind the edge of part $h$, below described, when the position of Fig. 1 is taken, so that the catch cannot be moved upward by a directly-upward knock, owing to the lug $m^2$ engaging behind the inclined edge of part $h$, but must have the end $m^2$ pushed laterally first in order to raise the arm. Arm $m$ may be attached outside member $b$, if preferred.

The means shown to prevent the blade becoming quite longitudinal with the handle comprises rear projections or shoulders which may have inclined faces $h$ on part $b$, or an attachment 1, Fig. 3, secured to part $b$, as by riveting, may be provided with shoulders $h$. In the latter case the base of the member $b$ is considerably strengthened.

There may be round pin $d$ a sleeve, as in Fig. 3, to reduce friction or to strengthen the construction. The swing of dog $e$ is ordinarily limited in the direction of the base of part $b$ by pin $d$ or its sleeve; but any suitable means is used.

The means to determine the smallest angle which blade $c$ will make with member $b$ (see Fig. 3) is shown by the location of the bottom of said member $b$. Instead of the position $b^3$ for said bottom (seen in Figs. 2 and 3 in firm lines) the bottom may extend to $b^2$, as shown dotted in Fig. 3. This insures that the blade shall stand at an obtuse angle to member $b$—that is, at a slight inclination from the horizontal—when the handle is vertical. By locating the end of member $b$ at a greater or less distance below pivot $d$ the relative positions the blade can take may be varied. In Fig. 4 pin $f$ is shown surrounded by washers and sleeves within the hollow of member $b$ for greater strength and to allow the dog to swing freely while preventing lateral movement of it on its pivot-pin. The means to permit the dog to be held in one or other of a series of positions are shown by a step or projection $i$ on the blade secured near the blade rear. In the position in Fig. 2 the step stops the dog from falling farther, and the weight of the lower portion of the blade will press the upper portion underneath and into contact with the underneath edge of the dog $e$. In the position shown in Fig. 3 the weight of the lower end of the blade presses the top $j$ of step $i$ against the under side of the dog. As will be understood, a series of steps could be arranged for.

What I do claim as my invention, and desire to secure by Letters Patent of the United States, is—

1. The combination with a handle, of a blade pivotally carried thereby, a freely-swinging automatically-operating pivoted dog directly engaging said blade, and means carried by said blade and adapted to be engaged by said dog for holding said blade adjusted in different positions, the whole constructed and coöperating to automatically secure said blade in varying positions upon oscillating said handle, substantially as described.

2. The combination with a handle, of a blade pivotally carried thereby, and a dog pivotally connected to said handle and extending rearwardly therefrom and adapted to directly engage the rear upper face of said blade, substantially as described.

3. The combination with a handle, of a blade pivotally carried thereby, means for holding said blade adjusted in different planes, comprising a step or projection on the upper face of said blade, and a pivoted dog carried by said handle and automatically operated upon oscillation of said handle to engage the upper face of said pivoted blade and the upper edge of said step or projection, substantially as described.

4. The combination with a handle, of a pivoted blade carried thereby, means for adjustably holding said pivoted blade in different planes, comprising as a single element a pivoted dog carried by said handle and adapted to directly engage said pivoted blade, means for holding said dog out of engagement with said pivoted blade, and means for locking said pivoted blade in a position forming a substantial longitudinal continuation of said handle, substantially as described.

5. The combination with a handle, of a blade pivotally suspended thereby, and means for limiting the rearward swing of said blade, comprising a rearwardly-projecting lug or ear carried at the lower end of said handle and adapted at its rear edge to engage the upper face of said blade, substantially as described.

6. The combination with a handle-socket member open at its lower rear end, of a blade pivotally suspended, from its upper face, on said socket member, a step or projection on the upper face of said blade and at the rear of said handle, means for automatically securing said blade in varying positions, comprising a pivoted dog carried by said socket member and operating through the rear opening thereof to engage at its lower edge the respective upper faces of said blade and said step, and edgewise projections on said socket member at the lower end thereof adapted to engage the front face of said blade to limit the rearward swing thereof, substantially as described.

In witness whereof I have hereunto set my hand in the presence of two witnesses.

ERNEST STANLEY WILLIAMSON.

Witnesses:
 GEORGE G. TURRI,
 E. F. NICHOLLS.